(12) United States Patent
Kawabata et al.

(10) Patent No.: US 8,130,120 B2
(45) Date of Patent: *Mar. 6, 2012

(54) PARKING ASSISTANCE DEVICE

(75) Inventors: Yukiko Kawabata, Toyota (JP); Yasushi Makino, Mishima (JP); Hideyuki Iwakiri, Tajimi (JP); Yuichi Kubota, Okazaki (JP); Tomohiko Endo, Toyota (JP); Miyuki Omori, Toyota (JP); Takuya Ito, Kuwana (JP); Atsuko Nakanishi, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/525,732

(22) PCT Filed: Feb. 20, 2008

(86) PCT No.: PCT/JP2008/052808
§ 371 (c)(1),
(2), (4) Date: Aug. 4, 2009

(87) PCT Pub. No.: WO2008/105282
PCT Pub. Date: Sep. 4, 2008

(65) Prior Publication Data
US 2010/0019935 A1 Jan. 28, 2010

(30) Foreign Application Priority Data
Feb. 27, 2007 (JP) ................................. 2007-047545

(51) Int. Cl.
*G01C 21/00* (2006.01)

(52) U.S. Cl. ........................................ 340/908; 340/454
(58) Field of Classification Search ................ 340/104, 340/932.2; 701/36, 1
See application file for complete search history.

(56) References Cited

U.S. PATENT DOCUMENTS

| 5,410,346 A | 4/1995 | Saneyoshi et al. |
| 5,602,740 A | 2/1997 | Nishiyama |

(Continued)

FOREIGN PATENT DOCUMENTS

DE 102005017361 A1 11/2005

(Continued)

OTHER PUBLICATIONS

Kawabata, Y et al., "Improvement of Reverse Parking Assist With Automatic Steering", 15th World Congress on ITS, p. 1-11, (2008).

(Continued)

*Primary Examiner* — Shirley Lu
(74) *Attorney, Agent, or Firm* — Oblon, Spivak, McClelland, Maier & Neustadt, L.L.P.

(57) ABSTRACT

A parking assistance device includes a guiding unit to perform guidance of a vehicle to a parking initial position from which the vehicle can be parked into a parking space located adjacent to and on a far side of an object existing around the vehicle with respect to a running direction of the vehicle; an obstacle detecting unit to detect an obstacle around the vehicle in response to a reflected wave of a wave emitted from the vehicle in a predetermined direction; and a timing setting unit configured to set a timing to start the guidance in response to a detection result of the obstacle detecting unit, which is related to an obstacle existing in a predetermined distance from the object in the parking space.

16 Claims, 11 Drawing Sheets

U.S. PATENT DOCUMENTS

| | | | |
|---|---|---|---|
| 6,102,147 | A | 8/2000 | Shimizu et al. |
| 6,170,591 | B1 | 1/2001 | Sakai et al. |
| 6,587,760 | B2 | 7/2003 | Okamoto |
| 6,778,891 | B2 | 8/2004 | Tanaka et al. |
| 6,828,903 | B2 | 12/2004 | Watanabe et al. |
| 7,053,795 | B2 | 5/2006 | Maemura et al. |
| 7,085,634 | B2 | 8/2006 | Endo et al. |
| 7,295,227 | B1 | 11/2007 | Asahi et al. |
| 7,369,940 | B2 | 5/2008 | Frank et al. |
| 7,679,495 | B2 | 3/2010 | Beutnagel-Buchner et al. |
| 7,706,944 | B2 | 4/2010 | Tanaka et al. |
| 7,800,516 | B2 | 9/2010 | Lüke |
| 7,903,842 | B2 | 3/2011 | Satonaka |
| 7,920,070 | B2 | 4/2011 | Chen et al. |
| 2003/0090570 | A1 | 5/2003 | Takagi et al. |
| 2003/0121706 | A1 | 7/2003 | Yamada et al. |
| 2003/0151526 | A1 | 8/2003 | Tanaka et al. |
| 2004/0020699 | A1 | 2/2004 | Zalila et al. |
| 2004/0204807 | A1 | 10/2004 | Kimura et al. |
| 2004/0260439 | A1 | 12/2004 | Endo et al. |
| 2005/0012603 | A1 | 1/2005 | Ewerhart et al. |
| 2005/0057374 | A1 | 3/2005 | Tanaka et al. |
| 2005/0273261 | A1 | 12/2005 | Niwa et al. |
| 2006/0069478 | A1 * | 3/2006 | Iwama ............ 701/36 |
| 2006/0115116 | A1 | 6/2006 | Iwasaki et al. |
| 2006/0167633 | A1 | 7/2006 | Satonaka et al. |
| 2006/0287826 | A1 | 12/2006 | Shimizu et al. |
| 2010/0220551 | A1 | 9/2010 | Akiyama et al. |

FOREIGN PATENT DOCUMENTS

| | | |
|---|---|---|
| DE | 102005015396 | 12/2005 |
| EP | 1 270 367 A2 | 1/2003 |
| EP | 1 468 893 A2 | 10/2004 |
| EP | 1 470 977 A1 | 10/2004 |
| EP | 1 591 315 A1 | 11/2005 |
| EP | 1 683 707 A1 | 7/2006 |
| JP | 63 122155 | 8/1988 |
| JP | 10 264840 | 10/1998 |
| JP | 2000 335435 | 12/2000 |
| JP | 2001 1931 | 1/2001 |
| JP | 2003 81041 | 3/2003 |
| JP | 2003-270344 | 9/2003 |
| JP | 2003 312414 | 11/2003 |
| JP | 2004-114977 | 4/2004 |
| JP | 2005-009992 | 1/2005 |
| JP | 2005-014738 | 1/2005 |
| JP | 2005-1713464 | 7/2005 |
| JP | 2005-335568 | 8/2005 |
| JP | 2006 71425 | 3/2006 |
| JP | 2006-120974 | 5/2006 |
| JP | 2006 189393 | 7/2006 |
| JP | 2007 71536 | 3/2007 |
| JP | 2007 326428 | 12/2007 |
| JP | 2008 195357 | 8/2008 |
| WO | WO 01/74643 A1 | 10/2001 |
| WO | 2007 122861 | 11/2007 |
| WO | 2007 122864 | 11/2007 |

OTHER PUBLICATIONS

Satonaka, H. et al., "Development of Parking Space Detection Using an Ultrasonic Sensor", 13th World Congress on ITS, Total 13 pages. (2006).

Endo, T. et al. "Development of Reverse Parking Assist With Automatic Steering", 10th World Congress on ITS, pp. 1-9, (2003).

Katsuhiko, I. et al., "Intelligent Algorithm for Generating a Vehicle Guidance Route in an Automatic Steering Type Parking Assist System". F20042049, Total 15 pages, (2004).

Endo, T. et al., "Development of Steering Assist System for Parking to Reduce Driver's Load", The Japan Society of Mechanical Engineers, 12TH Transportation and Logics, (TRANSLOG2003), Total 12 pages, (2003), (with English abstract).

U.S. Appl. No. 12/525,601, filed Aug. 3, 2009, Kawabata, et al.

European Search Report issued Feb. 28, 2011 in PCT/JP2008052808 filed Feb. 20, 2008.

Office Action mailed May 5, 2011, in co-pending U.S. Appl. No. 12/298,037.

* cited by examiner

PARKING ASSISTANCE DEVICE

TECHNICAL FIELD

The present invention relates to a parking assistance device to assist parking.

BACKGROUND ART

Conventionally, as a parking assistance device to assist parking of a vehicle into a parking space, there has been a known parking assistance device (for example, see Patent Document 1) which includes a detecting unit to detect a parking space, a recording unit to record information about the detected parking space, and a controlling unit to execute parking operation assistance that is required to guide the vehicle into the parking space. When a new parking space is recorded in the recording unit of this parking assistance device, existence of the parking space has been addressed to a driver in a recognizable way.

[Patent Document 1] Japanese Patent Application Publication No. 2003-81041

DISCLOSURE OF THE INVENTION

Problems to be Solved by the Invention

However, by the above-described conventional technique in which the existence of the parking space is addressed in the recognizable way to the driver when a new parking space is recorded, it has been sometimes impossible to appropriately perform the parking operation assistance depending on a condition of detecting the parking space. For example, when the detection of the parking space is delayed, a vehicle sometimes cannot stop at a parking initial position from which the vehicle can be appropriately parked into the parking space. As a result, even though the appropriate parking operation assistance cannot be executed in actuality, the existence of the detected parking space has been addressed to the driver.

In view of this, it is an object of the present invention to provide a parking assistance device which can suppress a situation where a vehicle cannot be guided to the parking initial position from which the vehicle can be appropriately parked into the parking space.

Means for Solving Problems

To achieve the above-described object, according to a first aspect of the present invention, a parking assistance device includes a guiding unit to perform guidance of a vehicle to a parking initial position from which the vehicle can be parked into a parking space located adjacent to and on a far side of an object existing around the vehicle with respect to a running direction of the vehicle; and a timing setting unit to set a timing to start the guidance in response to a speed of the vehicle.

According to a second aspect of the present invention, the parking assistance device according to the first aspect includes an obstacle detecting unit to detect an obstacle around the vehicle in response to a reflected wave of a wave emitted from the vehicle in a predetermined direction. The guiding unit starts the guidance when an obstacle in the parking space is not detected by the obstacle detecting unit in a predetermined distance from the object. The timing setting unit sets the predetermined distance in response to the speed of the vehicle.

According to a third aspect of the present invention, a parking assistance device includes a guiding unit configured to perform guidance of a vehicle to a parking initial position from which the vehicle can be parked into a parking space existing adjacent to and on a far side of an object around the vehicle with respect to a running direction of the vehicle; an obstacle detecting unit to detect an obstacle around the vehicle in response to a reflected wave of a wave emitted from the vehicle in a predetermined direction; and a timing setting unit to set a timing to start the guidance in response to a detection result of the obstacle detecting unit, which is related to an obstacle existing in a predetermined distance from the object in the parking space.

According to a fourth aspect of the present invention, in the parking assistance device according to the third aspect, the guiding unit starts the guidance when the obstacle in the parking space is not detected in the predetermined distance by the obstacle detecting unit.

According to a fifth aspect of the present invention, in the parking assistance device according to the third aspect, the predetermined distance is set in response to a speed of the vehicle.

According to a sixth aspect of the present invention, in the parking assistance device according to the first or third aspect, the parking space is a space sandwiched by the object and an obstacle existing in the running direction.

According to a seventh aspect of the present invention, in the parking assistance device according to the second or third aspect, the predetermined distance is less than an effective width required for the vehicle to be parked into the parking space.

According to an eighth aspect of the present invention, in the parking assistance device according to the seventh aspect, when an obstacle in the parking space is detected within the predetermined distance by the obstacle detecting unit, the guiding unit performs the guidance according to a clearance distance between the object and an obstacle related to the reflected wave. The clearance distance is calculated and obtained according to a reflected wave obtained after the obstacle is detected.

According to a ninth aspect of the present invention, in the parking assistance device according to the eighth aspect, the guiding unit starts the guidance when the calculated and obtained clearance distance is the effective width or greater.

According to a tenth aspect of the present invention, in the parking assistance device according to the eighth aspect, when the calculated and obtained clearance distance is less than the effective width, the guiding unit delays or cancels a start of the guidance.

According to an eleventh aspect of the present invention, in the parking assistance device according to the eighth aspect, when the calculated and obtained clearance distance is less than the effective width, the guiding unit makes a notification meaning that the parking space is narrower than the effective width.

Effect of the Invention

According to the present invention, such a situation can be suppressed where a vehicle cannot be guided to a parking initial position from which the vehicle can be appropriately parked into a parking space.

EXPLANATION OF REFERENCE NUMERALS

| | |
|---|---|
| 10 | parking assistance device |
| 12 | parking assistance ECU |
| 12A | parking space detecting part |
| 12B | assistance start timing setting part |
| 12D | parking assistance part |
| 13A | rotation correction processing part |
| 13B | parabola approximation part |
| 13C | oval approximation part |
| 16 | steering angle sensor |
| 18 | vehicle speed sensor |
| 20 | back monitor camera |
| 22 | display |
| 24 | speaker |
| 30 | steering control ECU |
| 50 | reverse shift switch |
| 52 | parking switch |
| 70 | ranging sensor |

BEST MODE FOR CARRYING OUT THE INVENTION

A description is given below, with reference to the drawings, of the best mode for carrying out the present invention. Since the present invention is especially effective for an application for perpendicular parking, the description below will be made of the perpendicular parking.

Figure 1:
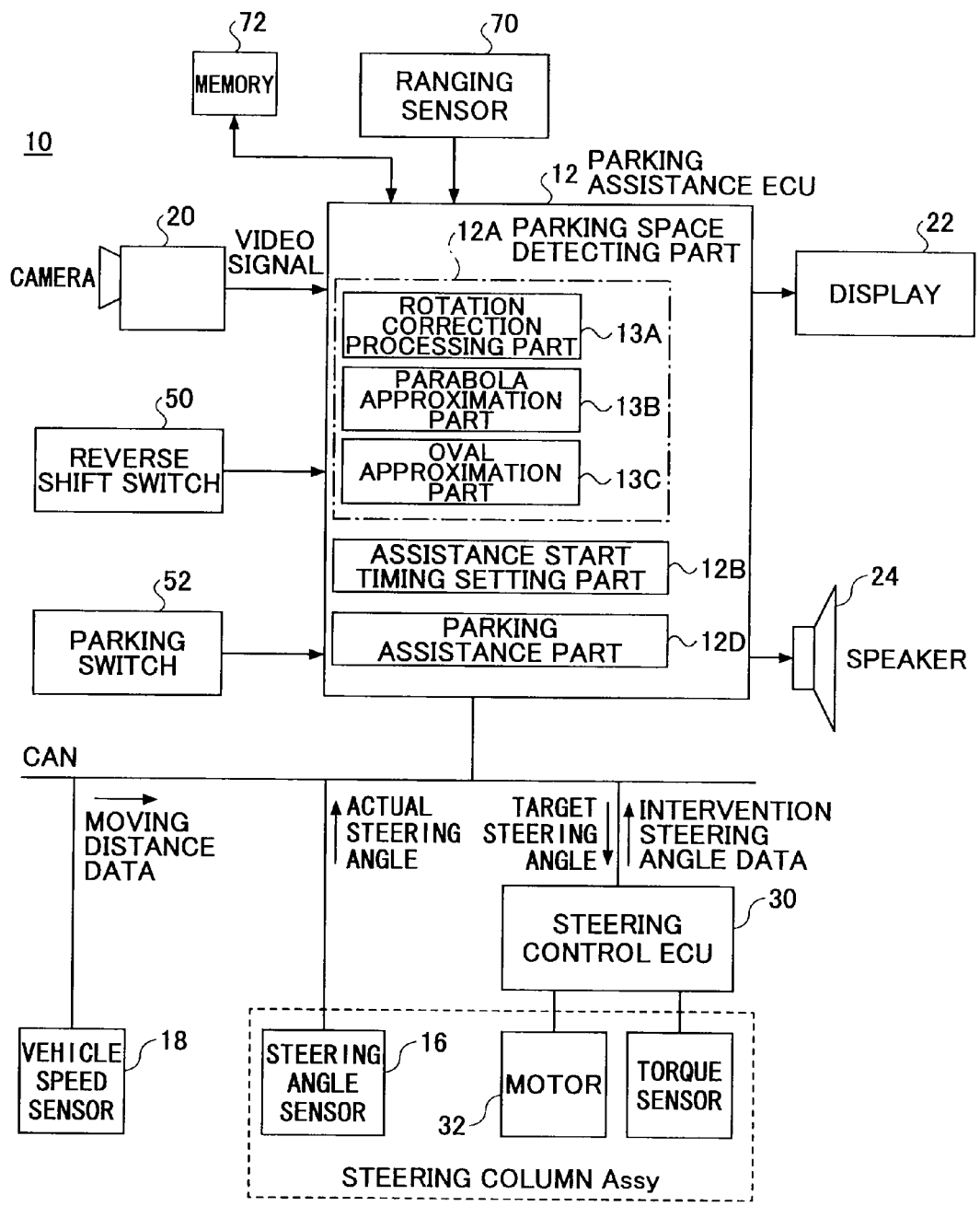
FIG. 1 is a system configuration diagram showing an embodiment of a parking assistance device 10 according to the present invention.

FIG. 1 is a system configuration diagram showing an embodiment of a parking assistance device 10 according to the present invention. As shown in FIG. 1, the parking assistance device 10 is configured including an electronic control unit 12 (hereinafter, referred to as "parking assistance ECU 12") as a center of the configuration. The parking assistance ECU 12 is a computer having a CPU, a ROM, a RAM, and the like mutually connected via a bus which is not shown. The ROM stores a program and data executed by the CPU.

The parking assistance ECU 12 is connected to a steering angle sensor 16 for detecting a steering angle of a steering wheel (not shown) and a vehicle speed sensor 18 for detecting a speed of the vehicle via an appropriate bus such as a CAN (Controller Area Network) and a high speed communication bus. The vehicle sensor 18 may be a wheel speed sensor that is provided for each wheel and generates pulse signals with cycles corresponding to a wheel speed.

The parking assistance ECU 12 is connected to a ranging sensor 70 for detecting a distance to an object around a host vehicle by using sound waves (such as ultrasonic waves), electromagnetic waves (such as millimeter waves), optical waves (such as a laser), and the like. The ranging sensor 70 may be, for example, a laser radar, a millimeter wave radar, an ultrasonic wave radar, a stereovision sensor, or anything capable of detecting a distance. The ranging sensor 70 operates on both left and right sides of a front part of the vehicle.

Figure 2:
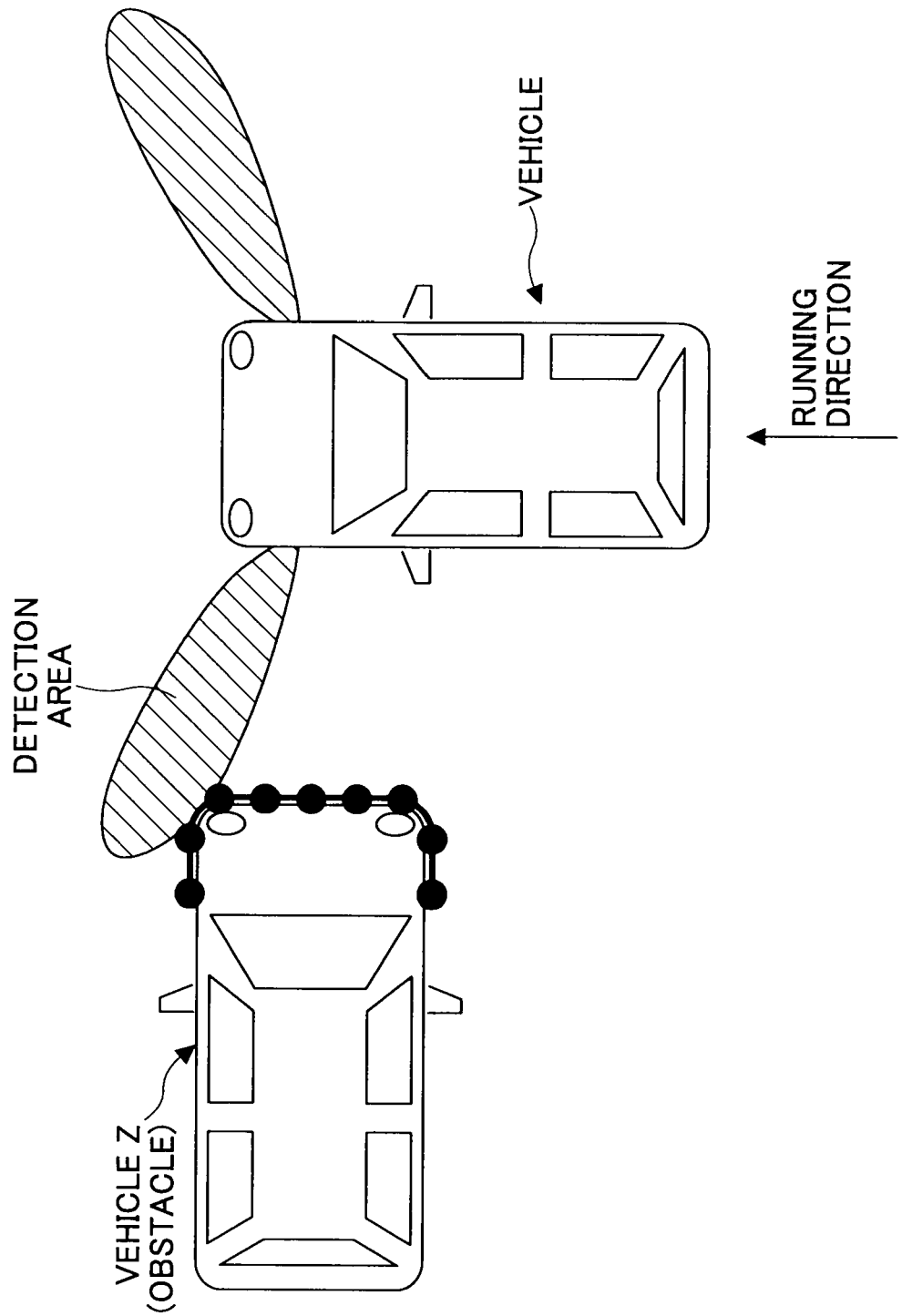
FIG. 2 is a diagram showing a detecting mode of an object to be detected (a vehicle Z in this example) by a ranging sensor 70.

As shown in FIG. 2, the ranging sensor 70 emits distance measuring waves such as sound waves in a predetermined direction having a direction of a vehicle width as a center, and receives reflected waves. Accordingly, the ranging sensor 70 detects a distance to an object existing on a lateral side of the vehicle (including a forward oblique direction with respect to a running direction of the vehicle). The ranging sensor 70 is mounted on a front part or a side part of the vehicle. Further, the ranging sensor 70 is mounted so that distance measuring waves are emitted in a front oblique direction at a predetermined angle with respect to a lateral direction of the vehicle. For example, the ranging sensor 70 may be mounted near a bumper in the front part of the vehicle to emit sound waves and the like, for example, in a front oblique direction at 17° to 20° with respect to the lateral direction of the vehicle. Moreover, the predetermined angle may be variable so that the emitting direction can be adjusted.

Figure 3:
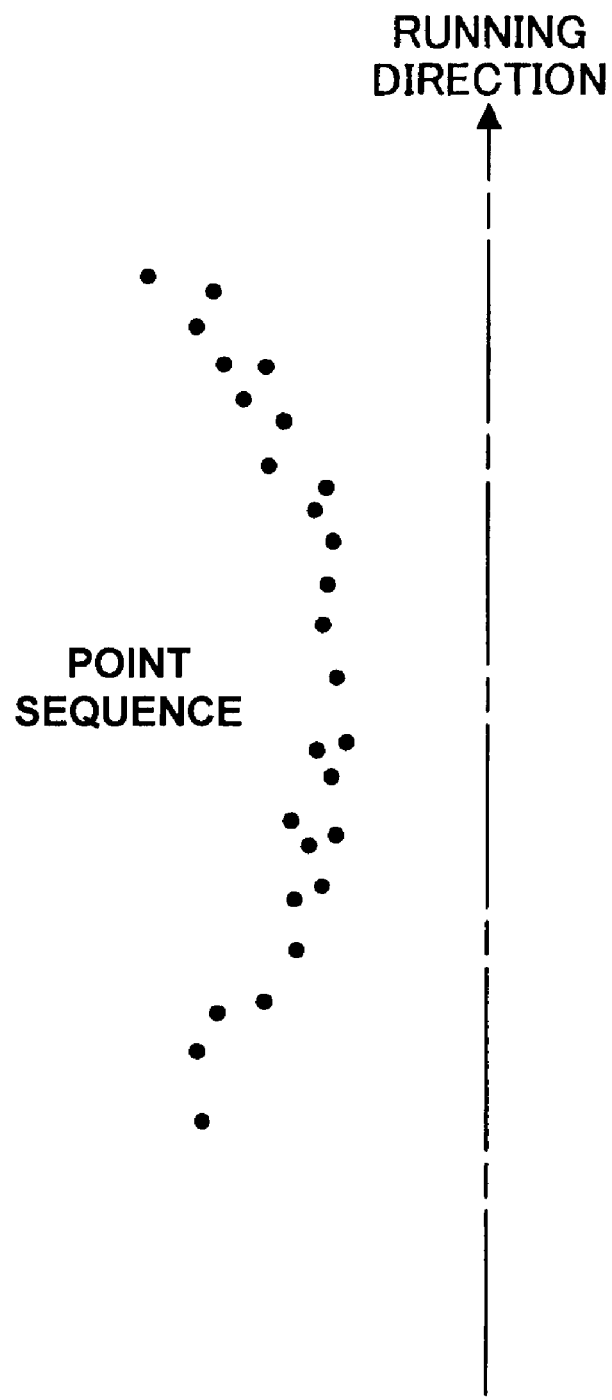
FIG. 3 is a schematic diagram showing a sequence of points related to the vehicle Z, which are obtained when a vehicle (host vehicle) having the ranging sensor 70 runs by the vehicle Z shown in FIG. 2.

FIG. 3 is a schematic diagram showing a sequence of points related to a vehicle Z, which points are obtained when a vehicle (host vehicle) having the ranging sensor 70 runs by an object (vehicle Z) shown in FIG. 2. The ranging sensor 70 may, as shown in FIG. 3, output reflection parts of the object (aggregate of reflected points of sound waves and the like) as the sequence of the points. The output data may be recorded in a memory 72 (for example, an EEPROM) per output cycle as required.

The parking assistance ECU 12 is connected to a reverse shift switch 50 and a parking switch 52. The reverse shift switch 50 outputs an on signal when a shift lever is operated into a back position (reverse) and keeps an off state in other situations. The parking switch 52 is provided in a cabin of the vehicle to allow operations by a user. The parking switch 52 is normally kept in an off state and turned on by the operation of the user.

The parking assistance ECU 12 determines whether the user needs parking assistance according to the output signal from the parking switch 52. That is, when the parking switch 52 of a running vehicle is turned on, the parking assistance ECU 12 starts parking assistance control for assisting running of the vehicle to a target parking position in a parking space as quickly as possible. The parking assistance control includes not only, for example, vehicle control such as steering control in running to the target parking position, but also, for example, an information output to the driver such as an output of a guidance message to guide the vehicle to the parking initial position, and steering assistance to assist the vehicle to appropriately move to the parking initial position.

As shown in FIG. 1, the parking assistance ECU 12 includes a parking space detecting part 12A, an assistance start timing setting part 12B, and a parking assistance part 12D. The parking space detecting part 12A includes a rotation correction processing part 13A, a parabola approximation part 13B, and an oval approximation part 13C.

The parking space detecting part 12A detects a parking space that can be present on the lateral sides of the vehicle according to a detection result (sequence of points) of the ranging sensor 70. The parking space detecting part 12A detects the parking space that can be present on the left and right sides of the vehicle according to the detection results of the left and right ranging sensors 70, independently and in parallel. The same detecting method can be employed for the left and right ranging sensors 70. Therefore, the detecting method of one side of the ranging sensor 70 is described below when a particular description is not provided. The detecting method of a parking space is different between the perpendicular parking and parallel parking. An example of a detecting method of a parking space in the case of the perpendicular parking is described here. The parking switch 52 may include a switch to specify either the perpendicular parking or the parallel parking. In this case, the parking assistance ECU 12 operates in a parking mode (a perpendicular parking mode or a parallel parking mode) according to the specified type of parking.

Figure 10:
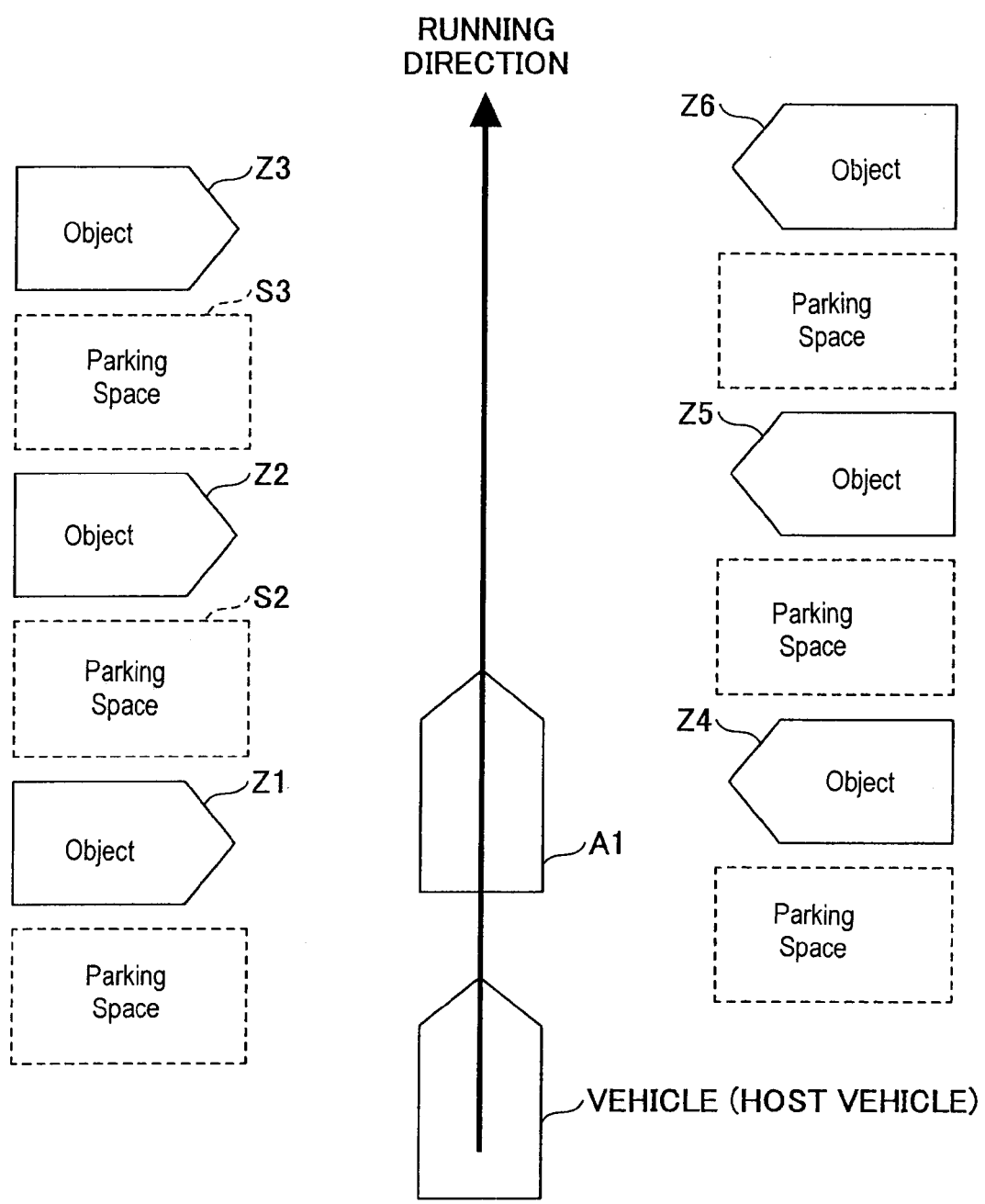
FIG. 10 is a plan view showing a situation of a parking lot for perpendicular parking.

FIG. 10 is a plan view showing a situation of a parking lot for the perpendicular parking. In this situation, there are plural available parking spaces (indicated by squares of dotted lines) on both sides of the vehicle. Objects (vehicles Z) are parked adjacent to the parking spaces. In FIG. 10, the vehicle (host vehicle) passes by sides of the objects (and the adjacent parking spaces) in a direction indicated by an arrow shown in the drawing. Note that a "far side" and a "near side" are based on the running direction of the vehicle (host vehicle).

When the vehicle passes by a side of a certain object, a detection area (length of a sequence of points) of the object detected by the ranging sensor 70 increases as the vehicle moves. The parking space detecting part 12A of this embodiment is an obstacle detecting unit to detect an obstacle around the host vehicle according to the detection result (sequence of the points) of the ranging sensor 70. That is, the parking space detecting part 12A detects the detection result (sequence of the points) by the ranging sensor 70 as an "object", and detects an object as an "obstacle" when the sequence of points corresponding to the object has a predetermined reference length or greater (or a predetermined length). The parking space detecting part 12A may be started when the parking switch 52 is turned on.

The parking space detecting part 12A sets a flag (hereinafter referred to as a "provisional flag") indicating that an obstacle has been provisionally detected, in a stage where the sequence of points has a predetermined reference length Lb (for example, 1 m) or longer. In a stage where the sequence of points with the predetermined reference length Lb or greater is detected, and then the sequence of points is not detected in a predetermined reference length Lc (for example, 50 cm) or greater, the parking space detecting part 12A detects an object corresponding to the sequence of points with the predetermined reference length Lb or greater as an "obstacle". At the same time, the parking space detecting part 12A sets a flag (hereinafter referred to as a "completion flag") indicating that the obstacle exists on a lateral side of the vehicle and detection of the obstacle is completed.

In a stage where the sequence of points is not detected in a predetermined reference length Ld (for example, 1.5 m) or greater after setting the completion flag, the parking space detecting part 12A estimates that there is an available parking space on the lateral side of the vehicle and sets a flag (hereinafter referred to as a "parking space available flag") indicating the existence. When a minimum required open width (available space width) as a parking space for the perpendicular parking is Le, the predetermined reference length Ld is greater than Lc and less than Le. The effective space width Le is a value which is to be determined depending on a vehicle width and the like of the host vehicle (Le=2.5 m in this embodiment). In this embodiment, in a stage where the sequence of points with the predetermined reference length Lb or greater is detected and then the sequence of points is not detected in the predetermined reference length Ld or greater, the vehicle space detecting part 12A estimates that there is an available parking space on a far side of the obstacle related to the completion flag, and sets a parking space available flag.

In this manner, in a stage where the sequence of points is not detected in the predetermined reference length of Ld or greater before the length where the sequence of points is not detected reaches the effective space width Le, it can be estimated that there is an available parking space on the far side of the obstacle related to the completion flag. This is because the ranging sensor 70 is mounted so that the distance measuring waves are emitted in the front oblique direction at a predetermined angle with respect to the lateral direction of the vehicle. That is, a distance with the obstacle existing on the lateral side of the vehicle is detected by receiving the reflected waves of the distance measuring waves emitted by the ranging sensor 70 in the front oblique direction at the predetermined angle with respect to the vehicle width direction. Therefore, the detection points appear on the nearer side of the actual position of the obstacle. Therefore, by focusing on the appearance of the detection points on the nearer side, in the case where the detection point appears about 1 m nearer than the actual position of the obstacle and the effective space width Le is 2.5 m, it can be estimated that there is an available parking space on the lateral side of the vehicle, in a stage where the sequence of points is not detected in the predetermined reference length Ld (1.5 m=(2.5 m−1 m) or greater. In other words, in the case where the sequence of points is not detected in the predetermined reference length Ld or greater after the sequence of points with the predetermined reference length Lb or longer is detected, it can be estimated that there is an available parking space with the effective space width Le or wider on the far side of the obstacle related to the completion flag, before detecting that the sequence of points is not detected in the effective space width Le or greater.

On the other hand, in the case where the sequence of points is detected before the length where the sequence of points is not detected reaches the predetermined reference length Ld after setting the completion flag, it is not soon determined that there is no parking space available on the lateral side of the vehicle, in consideration of a detection error by a receiving error of the reflected waves related to the sequence of points, and the like. The parking space detecting part 12A detects an object corresponding to the sequence of the predetermined number N1 (for example, two) of points, which points have started to be detected before the length where the sequence of points is not detected reaches the predetermined reference length Ld, as a "second obstacle", and at the same time, estimates a position of the second obstacle. The sequence of the predetermined number N1 of points may be also called a sequence of points included in a predetermined reference length L1. The estimation of the position of the second obstacle according to the sequence of the predetermined number N1 of points is performed by the rotation correction processing part 13A (the estimation of the position of the second obstacle according to the sequence of the predetermined number N1 of points by the rotation correction processing part 13A is described below). In the case where there is a distance of the effective space width Le or wider between an end part of the obstacle related to the completion flag and an end part of the second obstacle of which position is estimated by the rotation correction processing part 13A, the parking space detecting part 12A estimates that there is an available parking space on the far side of the obstacle related to the completion flag and sets the parking space available flag.

Meanwhile, in the case where there is a distance less than the effective space width Le between the end part of the obstacle related to the completion flag and the end part of the second obstacle of which position is estimated by the rotation correction processing part 13A, the parking space detecting part 12A continues an operation to detect the sequence of points before the sequence of the predetermined number N2 of points, which is greater than N1, is detected (or until the sequence of points with a predetermined reference length L2 which is greater than the predetermined reference length L1 is detected). That is, when there is a distance less than the effective space width Le between the end part of the obstacle related to the completion flag and the end part of the second obstacle, the parking space detecting part 12A estimates the position of the second obstacle according to the sequence of the predetermined number N2 of points (or the sequence of points with the predetermined reference length L2) detected with respect to the second obstacle. The position of the second obstacle is estimated by using the sequence of the predetermined number N2 of points which is greater than the predetermined number N1 (or the sequence of points with the predetermined reference length L2 which is greater than the predetermined reference length L1). Therefore, it takes a longer time for the detection than the case of detecting the sequence of the predetermined number N1 of points (or the sequence of points with the predetermined reference length L1); however, the precision of estimating the position of the second obstacle can be enhanced.

The parking space detecting part 12A estimates a shape of the second obstacle by performing curve approximation on, for example, the sequence of the predetermined number N2 of points detected with respect to the second obstacle. Accordingly, the position of the second obstacle is more accurately estimated. The estimation (curve approximation) of the position of the second obstacle according to the sequence of the predetermined number N2 of points is performed by the rotation correction processing part 13A, the parabola approximation part 13B, and the oval approximation part 13C (the estimation of the position of the second obstacle according to the sequence of the predetermined number N2 of points performed by the rotation correction processing part 13A, the parabola approximation part 13B, and the oval approximation part 13C is described below).

When there is a distance of the effective space width Le or greater between the end part of the obstacle related to the completion flag and an end part of the second obstacle of which position is estimated by the rotation correction processing part 13A, the parabola approximation part 13B, and the oval approximation part 13C, the parking space detecting part 12A estimates that there is an available parking space on a far side of the obstacle related to the completion flag, and thereby sets a parking space available flag. On the other hand, when there is a distance less than the effective space width Le between the end part of the obstacle related to the completion flag and the end part of the second obstacle of which position is estimated by the rotation correction processing part 13A, the parabola approximation part 13B, and the oval approximation part 13C, the parking space detecting part 12A determines that there is no available parking space on the lateral side of the vehicle, and thereby sets a flag (hereinafter referred to as a "parking space unavailable flag") indicating the determination.

When the parking space available flag or the parking space unavailable flag is set, assistance operations according to each flag, such as notification control and steering control are performed under the control of the parking assistance part 12D as described below. For example, when the parking space available flag is set, the driver is notified that there is an available parking space on the lateral side of the vehicle under the control of the parking assistance part 12D as described below. When the parking space unavailable flag is set, the driver is notified that there is no available parking space on the lateral side of the vehicle under the control of the parking assistance part 12D as described below. The output modes of these notifications may be realized by sound and/or a picture (a preferable output mode is described below). Accordingly, the driver can know whether there is an available parking space where the vehicle can be parked, on the lateral side of the vehicle. Thus, the work load on the driver to look for a parking space by eyes is reduced.

In the case of perpendicular parking, for example, when the vehicle is to be parked in a parking space on the near side of the vehicle Z, the driver has to start turning the steering wheel before reaching the vehicle Z. Otherwise, it often becomes difficult to bring the vehicle to the parking initial position where the assistance to the parking space (assistance in backing up the vehicle) can be performed. In this embodiment, considering above, a space on the far side of the vehicle Z is used as a parking space to be detected and notified, instead of the parking space on the near side. In this case, the notification to inform the driver of the parking space is performed in a stage where a predetermined space (a space with the length of Ld) is detected on the far side of the vehicle Z. Therefore, even when the driver starts turning the steering wheel at a position where the notification is made, the vehicle can easily reach the parking initial position where the assistance into the parking space can be performed. Further, the available parking space is reported to the driver in the stage where the sequence of points is not detected in the predetermined length Ld or greater. Thus, the notification timing can be earlier than the case of notifying the driver of the available parking space in a stage where the sequence of points is not detected in the effective space width Le or greater. With the earlier notification timing, the driver can recognize the existence or absence of the available parking space earlier. Moreover, even when a free running distance is caused after the notification before the driver starts turning the steering wheel, the driver can move the vehicle to the parking initial position easily. Further, a free running distance may be caused before the actual assistance operation starts under the control of the parking assistance part 12D. In that case, since the existence or presence of the available parking space can be estimated in a stage where the sequence of points is not detected in the predetermined reference length Ld or greater, which is less than the effective space width Le, the vehicle can be appropriately guided to the parking initial position even when such a free running distance is caused. Note that as for a parking space between two objects (for example, a top-left parking space in the drawing between the vehicles Z2 and Z3), a notification to the driver of the parking space (the parking space between the vehicles Z2 and Z3) on the far side of the vehicle Z2 is performed in a similar manner in a stage where a predetermined space (a space with the length of Ld) is detected on the far side of the vehicle Z2 that is on the near side.

Figure 4:
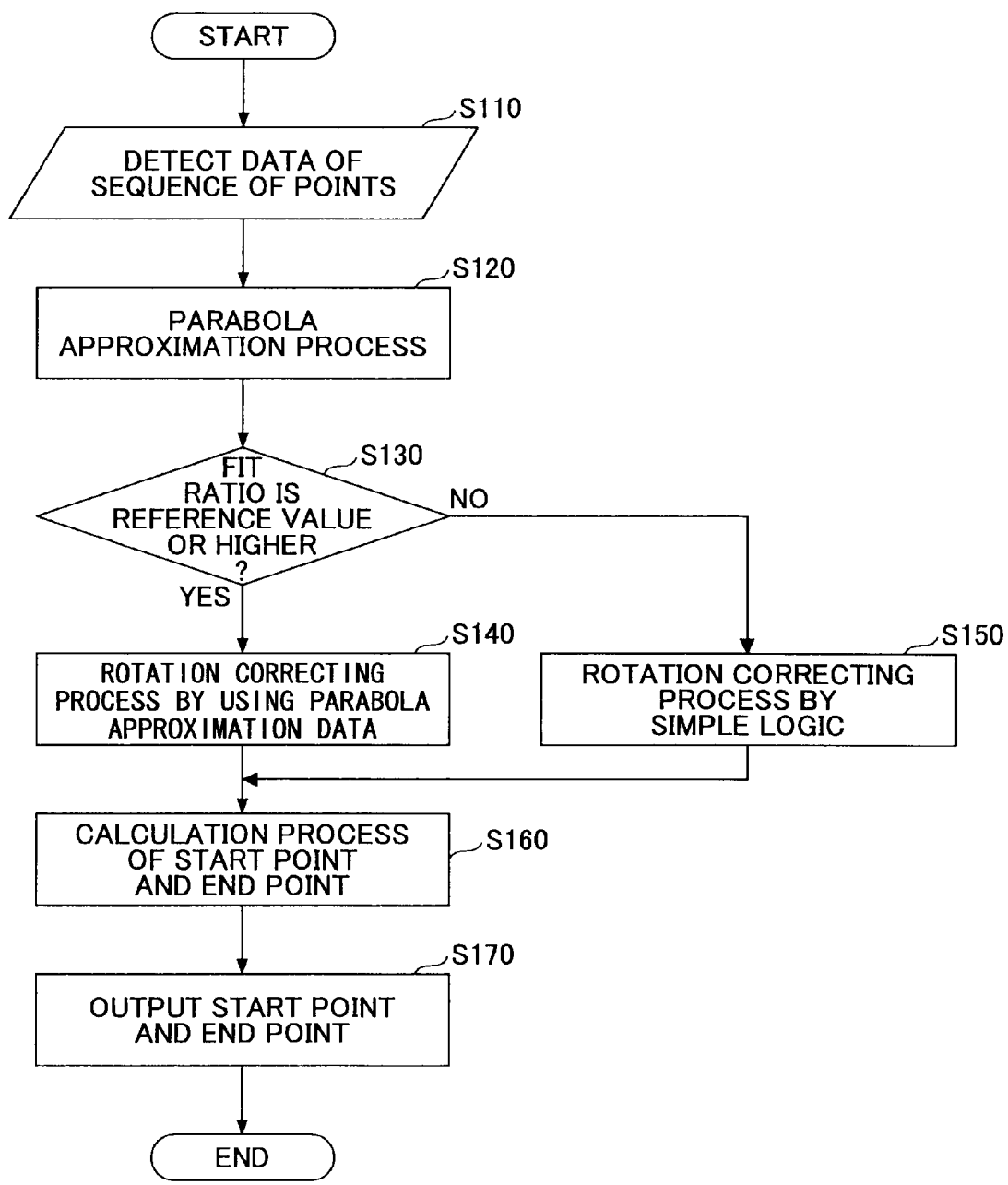
FIG. 4 is a flowchart showing a flow of a major process realized by a parabola approximation part 13B.
Figure 5:
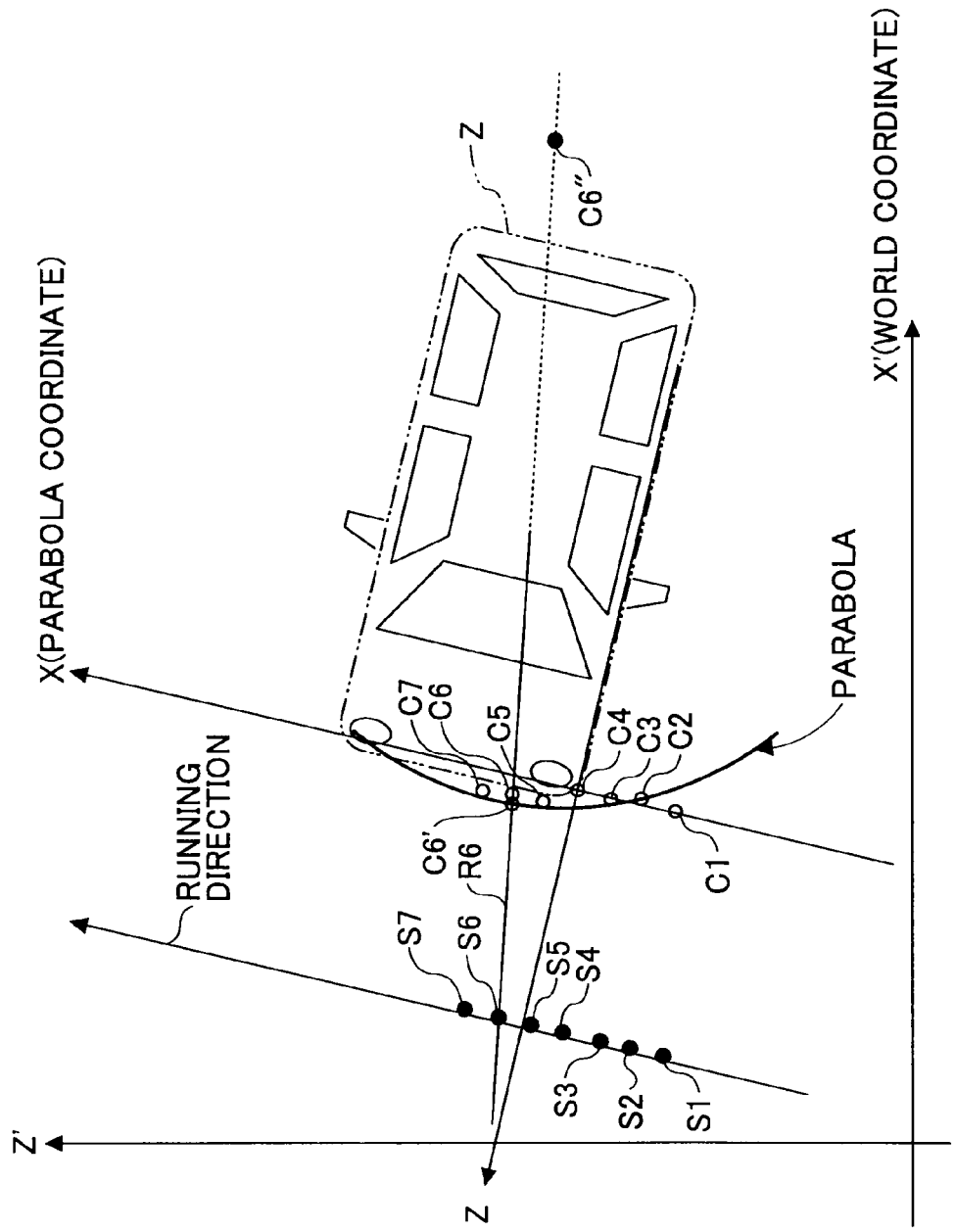
FIG. 5 is an illustration diagram of a parabola approximation process.
Figure 6:
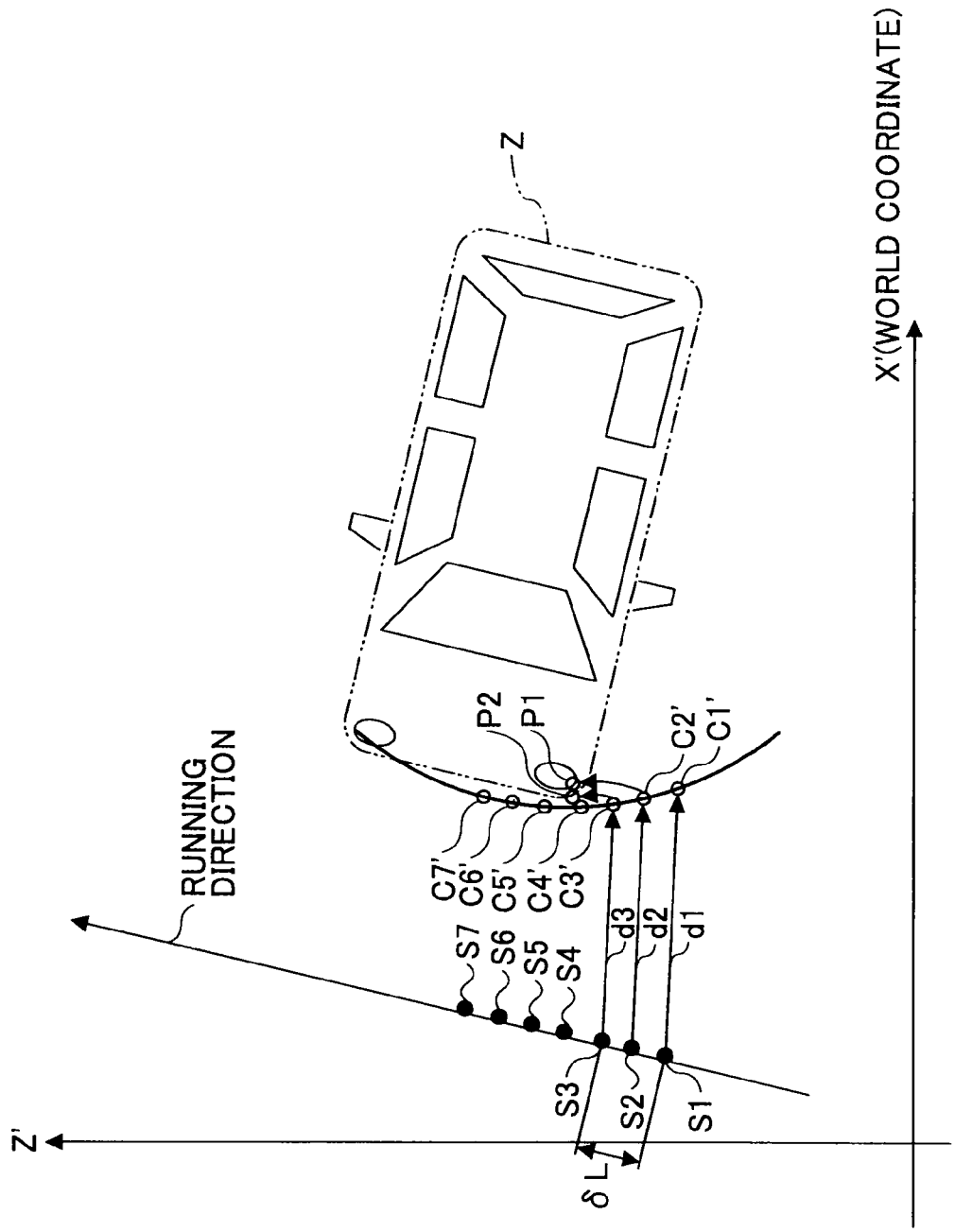
FIG. 6 is an illustration diagram of a rotation correcting process.

Next, a major process realized by the parabola approximation part 13B is described. FIG. 4 is a flowchart showing a flow of a major process realized by the parabola approximation part 13B. FIG. 5 is an illustration diagram of the parabola approximation process shown in FIG. 4. FIG. 6 is an illustration diagram of a rotation correcting process by the rotation correction processing part 13A. A process routine shown in FIG. 4 is started when the parking switch 52 is turned on. The process routine can be performed when a sequence of the predetermined number N2 of points, which is larger than the predetermined number N1 of points which points have started to be detected before reaching the predetermined reference length Ld after setting the completion flag, is detected (that is, when a part of the second obstacle is detected).

In step 110, the detection by the ranging sensor 70 is continued until data of a sequence of the predetermined number N2 of points are detected in accordance with running of the vehicle. That is, the data of the sequence of points with the predetermined reference length L2 (1 m in this embodiment) are detected by the ranging sensor 70.

In step 120, a parabola approximation process is performed as preprocessing on the data of the sequence of points, detected by the ranging sensor 70.

Here, details of the parabola approximation process are described with reference to FIG. 5. FIG. 5 shows data of the sequence of points (seven points C1 to C7 are shown as an example) which are converted into a world coordinate system (X', Z'). In addition, FIG. 5 also shows positions S1 to S7 (hereinafter referred to as sonar positions S1 to S7) of the ranging sensor 70 when the points C1 to C7 were being detected.

First, as shown in FIG. 5, the parabola approximation part 13B defines a parabolic coordinate system (X, Z). In the parabolic coordinates, a running direction of the vehicle corresponds to an X axis while a direction perpendicular to the running direction corresponds to a Z axis. The origin of the coordinates is set as a center point (the point C4 in this embodiment) among all the points of the data of the sequence of points used for approximation. Note that the running direction of the vehicle may be determined according to the orientation (a deviation angle α to be described below) of the vehicle of the time when the provisional flag is set. Subsequently, the parabola approximation part 13B performs parabola approximation (quadratic curve) on the data of the sequence of points by a least squares method and the like in the parabolic coordinate system set as described above. That is, coefficients a, b, and c in a formula: $a*x^2+b*z+c=0$ which best fits the data of the sequence of points are calculated (note that * indicates a multiplication). Next, the parabola approximation part 13B corrects the data of the sequence of points so that the points C1 through C7 of the data of the sequence of points are set on the obtained parabola. For example, as for the point C6, intersection points C6' and C6'' (normally two points) between the parabola and a straight line R6 connecting the point C6 and the sonar position S6 are obtained. The point C6 is corrected into the intersection point C6' which is closer to the sonar position C6, as shown in FIG. 5. In this manner, corrections are performed on all the points C1 to C7. Note that the correction may be performed by projecting in a normal line direction with respect to the parabola. Data of the sequence of points (C1' to C7') obtained in this manner are called "parabola approximation data" for convenience.

Returning to FIG. 4, in step 130, it is determined whether a fit ratio is a predetermined reference value or higher according to the result of the parabola approximation process. The fit ratio is a goodness of fit of the sequence of points used for approximation with respect to the calculated approximation curve (parabola). When the fit ratio is the predetermined reference value or higher, that is when the parabola approximation has succeeded, the process proceeds to step 140. When the parabola approximation has failed, the process proceeds to step 150.

In step 140, a rotation correcting process is performed by using the result of the parabola approximation process performed in step 130 described above. That is, the rotation correction processing part 13A performs the rotation correcting process by using the parabola approximation data obtained in step 130.

Here, details of the rotation correcting process are described with reference to FIG. 6. FIG. 6 shows the parabola approximation data (C1' to C7') and the sonar positions S1 to S7 in the world coordinate system. As shown in FIG. 6, for example, the rotation correction processing part 13A performs, per three points from an end of the parabola approximation data, rotation correction of a center point of the three points by using data of the three points as shown in FIG. 6. For example, data of three points C1' to C3' are used to perform rotation correction of the point C2'. At this time, a rotation angle θ for the rotation correction of the point C2' may be, for example, obtained by $\theta=\mathrm{Arcsin}((d3-d1)/\delta L)$. Moreover, a rotation radius of the rotation correction of the point C2' may be a distance d2 between the point C2' and the sonar position S2. A rotation center of the rotation correction of the point C2' may be the sonar position S2. Next, rotation correction of the point C3' is performed by using data of the next three points C2' to C4', and rotation corrections of the rest of the points are sequentially performed in similar manners. Accordingly, data of the sequence of points (P1 to P5) which have undergone the rotation correction are obtained.

In step 150, a rotation correcting process is performed by using the data of the sequence of points detected by the ranging sensor 70 in step 110 described above. That is, the rotation correction processing part 13A performs the rotation correcting process by using the data of the sequence of points before the correction instead of using the parabola approximation data obtained in step 130 (note that the data of the sequence of points may undergo basic preprocessing such as noise removal). A method of the rotation correcting process may be the same as that described with reference to FIG. 6.

In step 160, coordinates of a start point and an end point of the obstacle are calculated according to the data of the sequence of points (P1 to P5) obtained by the rotation correcting process. The coordinates of the start point of the obstacle are coordinates of an endmost point (P2 in this embodiment) on the near side of the running direction of the vehicle, among the data of the sequence of points P1 to P5 in the world coordinate system. There are no data of the sequence of points corresponding to the coordinates of the end point of the obstacle at the time of detecting the data of the sequence of points with the predetermined length L2, which is different from the start point of the obstacle. Therefore, coordinates offset by a predetermined distance (for example, 1.7 m) from the start point of the obstacle along the running direction of the vehicle are used as the coordinates of the end point of the obstacle.

In step 170, the coordinates of the start point and the end point of the obstacle obtained in step 160 are outputted.

In this manner, according to this embodiment, in a stage where the predetermined number N2 of points are detected, which have started to be detected before the length where the sequence of points is not detected reaches the predetermined length Ld after the completion flag is set, relatively few data elements of the sequence of points are obtained. Nevertheless, by using the parabola approximation, the shape of the second obstacle (the start point and end point of the obstacle (end parts of the obstacle) in this embodiment) can be estimated with high precision.

Figure 7:
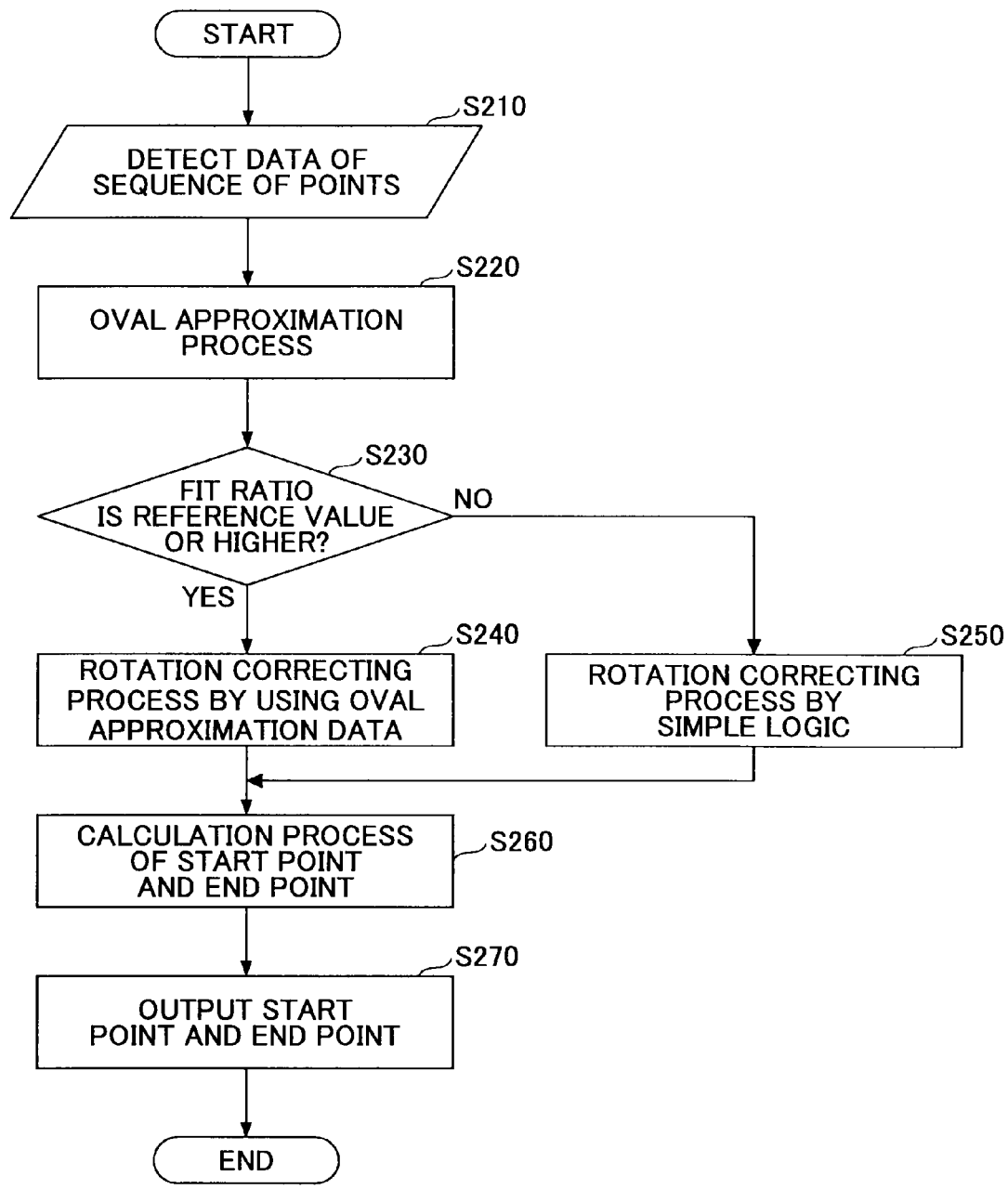
FIG. 7 is a flowchart showing a flow of a major process realized by an oval approximation part 13C.
Figure 8:
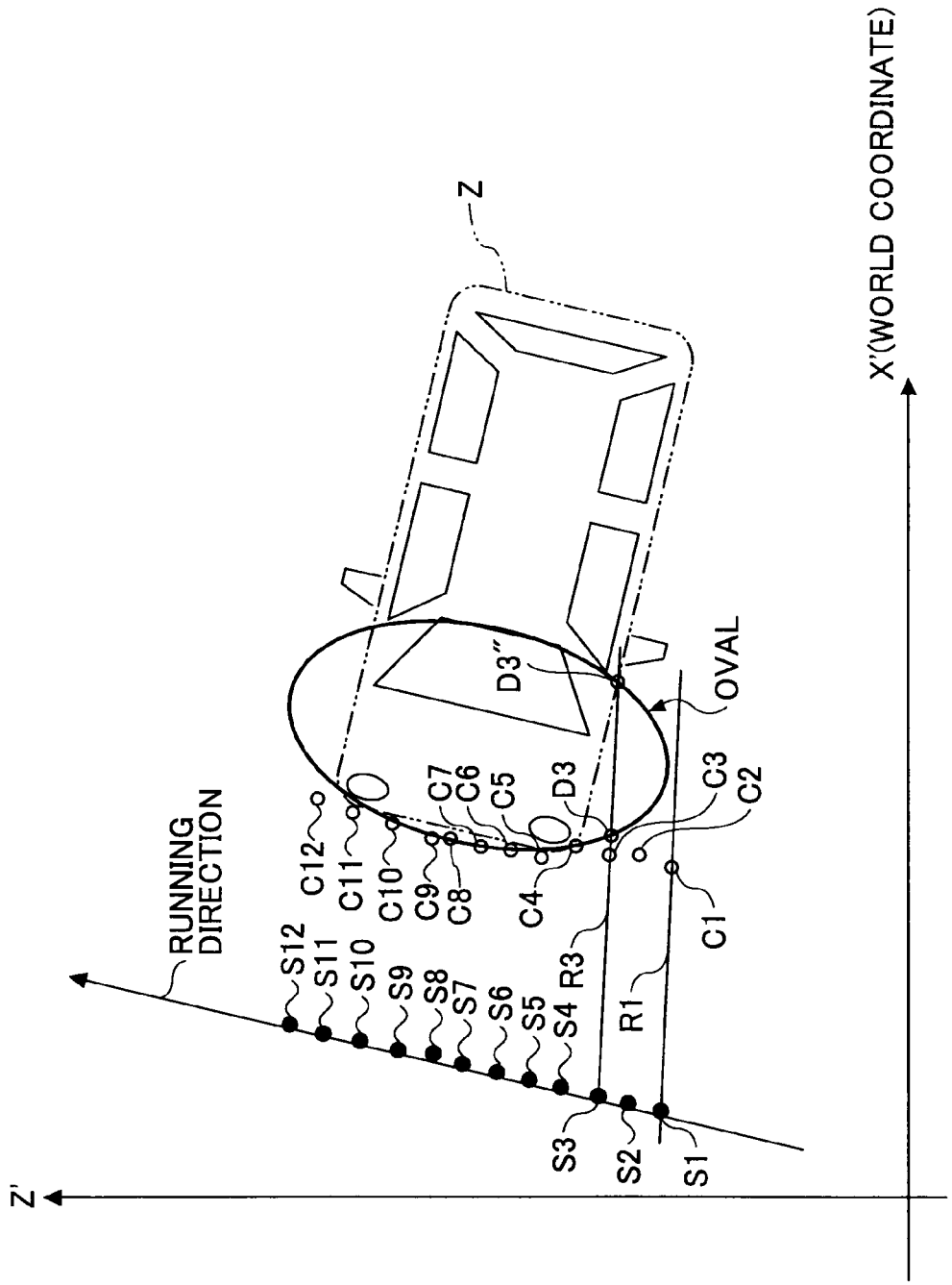
FIG. 8 is an illustration diagram of an oval approximation process.

Next, a major process realized by the oval approximation part 13C is described. FIG. 7 is a flowchart showing a flow of a major process realized by the oval approximation part 13C. FIG. 8 is an illustration diagram of an oval approximation process in FIG. 7. A process routine shown in FIG. 7 is started when the parking switch 52 is turned on. The process routine can be performed when the sequence of a predetermined number N3 of points, which is larger than the predetermined number N2, is detected, which have started to be detected before reaching the predetermined reference length Ld after the completion flag is set (that is, when a part of the second obstacle is detected).

In step 210, the detection by the ranging sensor 70 is continued until data of a sequence of the predetermined number N3 of points are detected in accordance with running of the vehicle. That is, the data of the sequence of points with a predetermined reference length L3 (1.5 m in this embodiment) are detected by the ranging sensor 70.

In step 220, an oval approximation process is performed as preprocessing on the data of the sequence of points detected by the ranging sensor 70.

Here, details of the oval approximation process are described with reference to FIG. 8. FIG. 8 shows data of the sequence of points (twelve points C1 to C12 are shown as an example) which are converted into a world coordinate system (real coordinate system). In addition, FIG. 8 also shows positions S1 through S12 (sonar positions S1 through S12) of the ranging sensor 70 when the points C1 through C12 are detected.

First, the oval approximation part 13C performs oval approximation on the data of the sequence of points. To be specific, coefficients d, e, f, g, h, and f of a general formula of an oval: $d*x^2+e*x*z+f*z^2+g*x+h*z+f=0$ are calculated by, for example, RANSAC (Random Sample Consensus). In the example shown in FIG. 8, since the data of the sequence of twelve points are used, all the points C1 through C12 may be used. However, processing time may be huge depending on the number of points to be inputted. Therefore, the number of points to be inputted may be reduced (for example, 20 points at maximum). Next, the oval approximation part 13C corrects the data of the sequence of points so that the points C1 through C12 are set on the obtained oval. Specifically, the points of the data of the sequence of points and corresponding sonar points are connected by straight lines, in a similar manner to the above-described parabola approximation. Then, intersection points (normally two points) between the straight lines and the oval are obtained. Each point of the data of the sequence of points is corrected into one of the corresponding intersection points, which is closer to the sonar position. For example, for the point C3, intersection points D3 and D3" of the oval and a straight line R3 connecting the point C3 and the sonar position S3 are obtained as shown in FIG. 8. Then, the point C3 is corrected into the intersection point D3 which is closer to the sonar position C3. In this manner, corrections are performed on all the points. In this case, when there are no intersection points as described above for any of the three points C1 through C3 from the end, it is obvious that the fit ratio is low. Therefore, the data of those sequence of points do not have to be corrected.

The data of the sequence of points obtained in this manner are called "oval approximation data" for convenience. The oval approximation data include D1 through D12 when there is an intersection point with respect to the endmost point C1, include D2 through D12 when intersection points start appearing from the next point C2, and include D3 through D12 when intersection points start appearing from the next point C3. The intersection point with respect to the point provided at the end sometimes does not exist because the ranging sensor 70 attached to the bumper and the like of the vehicle emits the detection waves in the front oblique direction. Thus, when the vehicle approaches the obstacle, data of a distance with a side surface of the obstacle can also be included.

Returning to FIG. 7, in step 230, it is determined whether a fit ratio is at a predetermined reference value or higher according to the result of the oval approximation process. When there is no intersection point for any of the three points C1 through C3 from the end as described above, a negative determination is made in this determination process.

In step 240, the rotation correcting process is performed by using the result of the oval approximation process performed in step 230. That is, the rotation correction processing part 13A performs a rotation correcting process by using the oval approximation data obtained in step 230. The same method described with reference to FIG. 6 may be used for the rotation correcting process except that different data are used.

In step 250, the rotation correcting process is performed by using the data of the sequence of points detected by the ranging sensor 70 in step 210. That is, the rotation correction processing part 13A performs the rotation correcting process by using the data of the sequence of points before the correction, instead of using the oval approximation data obtained in step 230. The same method as the method described with reference to FIG. 6 may be used for the rotation correcting process, except that different data are used.

In step 260, coordinates of the start point and the end point of the obstacle are calculated according to the data of the sequence of points obtained by the rotation correcting process. The coordinates of the start point of the obstacle are coordinates of an endmost point on the near side in the running direction of the vehicle, among the data of the sequence of points which have undergone rotation correction. On the other hand, when the process has been performed via step 250, that is, when the correction by the oval approximation process is not performed, coordinates offset by a predetermined distance (for example, 1.7 m) from the start point of the obstacle along the running direction of the vehicle are used as the coordinates of the end point of the obstacle. Meanwhile, when the process has been performed via step 240, that is, when the correction by the oval approximation process is performed, coordinates offset from the point detected last (in the above example, a point corresponding to C12 after the correction) to the near side by a predetermined distance (for example, 0.5 m) along the running direction of the vehicle are used as the coordinates of the end point of the obstacle. At this time, when there is a distance of less than a general width (for example, 1.7 m) of the obstacle between the start point and the end point of the obstacle, the coordinates of the end point of the obstacle are offset on the far side by a predetermined distance (for example. 1.7 m) along the running direction of the vehicle with respect to the start point of the obstacle.

In step 270, the coordinates of the start point and end point of the obstacle obtained in step 260 are outputted.

In this manner, according to this embodiment, in a stage where the predetermined number N3 of points are detected, which have started to be detected before the length where the sequence of points is not detected reaches the predetermined length Ld after the completion flag is set, relatively many data elements of the sequence of points are obtained. Therefore, by using the oval approximation focusing on this, the shape of the second obstacle (the start point and end point of the obstacle (end parts of the obstacle) in this embodiment) can be estimated with high precision.

Next, a process realized by the assistance start timing setting part 12B is described. The assistance start timing setting part 12B varies a value of the predetermined reference length Ld in response to a current speed of the host vehicle detected by the vehicle speed sensor 18. When the predetermined reference length Ld changes, a timing to set the parking space available flag and the parking space unavailable flag changes, which also changes a start timing of the assistance operation by the parking assistance part 12D. Therefore, when the value of the predetermined reference length Ld is variable in response to the current speed of the vehicle, the start timing of the assistance operation by the parking assistance part 12D can be controlled in response to the current speed of the vehicle.

The assistance start timing setting part 12B may, for example, set the predetermined reference length Ld to be longer as the current speed of the host vehicle is increased (for example, Ld is 1.5 m when the current speed of the vehicle is 3 km/h and Ld is 2.0 m when the current speed of the vehicle is 6 km/h). Accordingly, even when the detection precision of the ranging sensor 70 is decreased as the speed of vehicle increases, the predetermined reference length Ld required for estimating the presence or absence of the available parking space is taken to be longer as the vehicle speed increases. Thus, the presence or absence of the available parking space can be appropriately estimated.

Further, for example, the assistance start timing setting part 12B may set the predetermined reference length Ld to be less as the current speed of the vehicle increases (for example, Ld is 2.0 m when the current speed of the vehicle is 3 km/h and Ld is 1.5 m when the current speed of the vehicle is 6 km/h). Accordingly, the timing to set the parking space available flag and the parking space unavailable flag is set earlier as the vehicle speed increases. Thus, a delay of the assistance operation by the parking assistance part 12D and a delay of a steering operation by the driver can be prevented.

Therefore, by controlling the value of the predetermined reference length Ld to be an appropriate value in response to the current speed of the host vehicle, such a situation can be suppressed where the vehicle cannot be guided to the parking initial position so that the parking into the parking space can be appropriately assisted.

Figure 9:
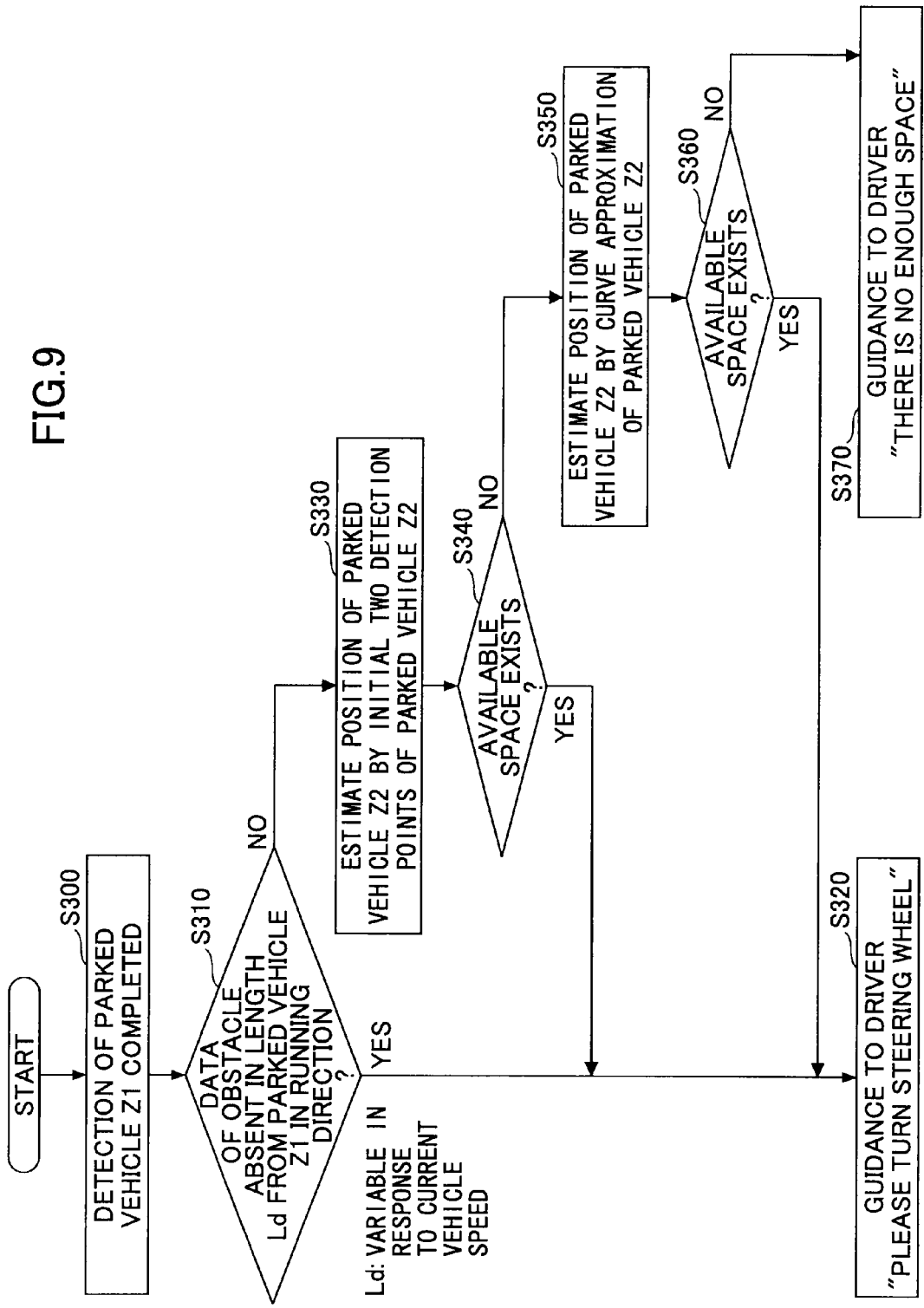
FIG. 9 is a flowchart showing a flow of a major process realized by a vehicle assistance ECU 12.

FIG. 9 is a flowchart showing a flow of a major process realized by the parking assistance ECU 12. This flowchart is described with reference to FIG. 10.

In step 300, it is determined whether a completion flag of a parked vehicle Z1 is set. The process does not proceed to step 310 unless the completion flag of the parked vehicle Z1 is set.

In step 310, by monitoring whether a sequence of points is detected in the predetermined reference length Ld after the completion flag of the parked vehicle Z1 is set as described above, the parking space detecting part 12A determines whether there are data of an obstacle detected in the length Ld from the parked vehicle Z1 in the running direction. Here, the predetermined reference length Ld can be varied by the assistance start timing setting part 12B in response to the current speed of the vehicle as described above. When the sequence of points is not detected in the length Ld from the parked vehicle Z1 in the running direction, a parking space available flag is set and the process proceeds to step 320. When the sequence of points is detected in the length Ld from the parked vehicle Z1 in the running direction, the process proceeds to step 330.

In step 320, when the parking space available flag is set, the parking assistance part 12D outputs a ping sound via a speaker 24 (see FIG. 1), and at the same time makes a steering instruction for guiding the vehicle to the parking initial position. Note that the ping sound may be outputted from one of the left and right speakers 24, which is provided on a side where the parking space exists. Accordingly, the driver can aurally recognize the side where the parking space exists.

Further, the steering instruction may be made by a voice output or a steering instruction display, meaning, for example, "Please run forward slowly by turning the steering wheel, until you hear a ding-dong sound". This steering instruction display is made on a display 22 with the ping sound when the parking space available flag is set as described above. Accordingly, the driver can easily understand a point to start turning the steering wheel and also easily understand to run the vehicle forward slowly by turning the steering wheel until a notification by the ding-dong sound, informing the driver that the vehicle has reached the parking initial position, is outputted.

Next, according to the data of the start point and the end point of the obstacle obtained by the parabola approximation part 13B, the parking assistance part 12D calculates a parking initial position suitable for parking into the parking space to which the vehicle is guided. Various methods can be employed to calculate the parking initial position. For example, a target parking position (for example, the position of the center of a rear axle of the vehicle in the parking space) is determined at a predetermined relative position with respect to the start point of the obstacle. By considering a maximum turning curvature and the like of the vehicle, a parking initial position from which the vehicle can be parked into the determined target parking position is calculated and determined. Note that the parking initial position where the assistance into the parking space is possible does not include one point but a range. Thus, the parking initial position may be defined as an allowable position range. Next, according to output signals of the steering angle sensor 16 and the vehicle speed sensor 18, the parking assistance part 12D calculates a change amount of the orientation of the vehicle (this change amount is hereinafter referred to as an "orientation angle α") with respect to a predetermined reference direction in a predetermined section. By this orientation angle α, the trajectory of a subsequent movement of the vehicle is estimated. Note that the orientation angle α is defined by the clockwise direction being a positive direction and the counterclockwise direction being a negative direction. Here, the orientation angle α can be generally calculated by formula 1, when a micro-movement distance of the vehicle is ds and γ is a road surface curvature (corresponding to an inverse number of a turning radius R of the vehicle). By formula 1, the orientation angle α is obtained as a change of the orientation of the vehicle, which is caused for the vehicle to reach the current position from a position that is at βm (β=7 in this embodiment) on the near side.

$$\alpha = \int_{-\beta}^{0} \gamma \cdot ds \qquad \text{[Formula 1]}$$

According to formula 2 below obtained by transforming formula 1, the parking assistance part 12D calculates a small orientation angle $\alpha_i$ caused in every predetermined moving distance (0.5 m in this embodiment), and calculates the orientation angle α by summing the obtained small orientation angles $\alpha_1$ through $\alpha_k$.

$$\alpha = \sum_{i=1}^{k} \alpha_i, \; \alpha_i = \int_{-0.5}^{0} \gamma \cdot ds \qquad \text{[Formula 2]}$$

At this time, the predetermined movement distance (0.5 m in this embodiment) is monitored by time-integrating the output signals (wheel speed pulses) of the vehicle speed sensor 18. Further, the road surface curvature γ is determined according to a steering angle Ha obtained by the steering angle sensor 16. For example, the road surface curvature γ is obtained by a formula: γ=Ha/L·η (L indicates a wheel base length, and η indicates an overall gear ratio of the vehicle (a ratio of the steering angle Ha to a wheel turning angle)). Note that the small orientation angle $α_i$ may be calculated by multiplying the small movement distance of 0.01 with the road surface curvature γ which is obtained in every small movement distance of 0.01 m, and integrating the multiplied values of the movement distance of 0.5 m. Note that a relationship between the road surface curvature γ and the steering angle Ha may be stored, as a map formed according to correlation data acquired for each vehicle in advance, in the ROM of the parking assistance ECU 12. Note that the orientation angle α may be calculated at all times. In this case, the obtained orientation angle α may be used to estimate the above-described running direction of the vehicle.

The parking assistance part 12D performs the steering instruction for guiding the vehicle to the parking initial position, according to a relationship between the current vehicle position estimated as described above and the parking initial position. For example, the parking assistance part 12D may output a message by display and/or voice, meaning "Please start at a position a little closer to the parking space", "Please start at a position a little further from the parking space", or "Please turn the vehicle a little more" via the speaker 24 or the display 22 (see FIG. 1) as required.

In step 330 in FIG. 9, since the sequence of points is detected in the length Ld in the running direction from the parked vehicle Z1 in step 310, the rotation correcting process is performed by the rotation correction processing part 13A as described above. Accordingly, the position of the obstacle (the parked vehicle Z2 here) related to the sequence of the predetermined number N1 of points, which points have started to be detected before reaching the predetermined reference length Ld, is estimated. The rotation correcting processing part 13A performs the rotation correcting process by using the data of the sequence of the predetermined number N1 of points before the correction, which points are detected by the ranging sensor 70 (note that the data of the sequence of points may undergo a basic preprocessing such as noise removal). The same method described with reference to FIG. 6 may be used for the rotation correcting process, except that different data are used. The predetermined number N1 may be three points as shown in FIG. 6, the number of points larger than three, or two points which have initially started to be detected, as a minimum number of points. In the case where the predetermined number N1 is two, and the points C1' and C2' are assumed to be the data of the sequence of points before undergoing the rotation correction, which points have initially started to be detected by the ranging sensor 70, the rotation correction of the point C2' is performed by using the data of the points C1' and C2'. At this time, a rotation angle θ obtained by a formula: θ=Arcsin((d2−d1)/δL) may be used for the rotation correction of the point C2 (δL in this case indicates a distance between S1 and S2).

In step 340, in the case where there is a distance of the effective space width Le or wider between an end part of the parked vehicle Z1 related to the completion flag and an end part of the parked vehicle Z2 of which position is estimated by the rotation correction processing part 13A, the parking space detecting part 12A estimates that there is an available parking space S2 on the far side of the parked vehicle Z1 and sets a parking space available flag. The end part of the parked vehicle Z1 may be specified by the coordinates of the end point obtained by the oval approximation process as described above. The end part of the parked vehicle Z2 may be specified by the coordinates of the start point obtained by the rotation correcting process as described above. When the parking space available flag is set in step 340, the parking assistance part 12D outputs a ping sound via the speaker 24 (see FIG. 1) and at the same time executes a steering instruction for guiding the vehicle to the parking initial position in step 320 as described above. On the other hand, in the case where there is a distance less than the effective space width Le between the parked vehicle Z1 related to the completion flag and the parked vehicle Z2 of which position is estimated by the rotation correction processing part 13A in step 340, the process proceeds to step 350.

In step 350, by performing curve approximation by the rotation correction processing part 13A, and the parabola approximation part 13B and/or the oval approximation part 13C as described above, the position of the parked vehicle Z2 is estimated according to the data of the sequence of the predetermined number N2 and/or N3 of points, which points have started to be detected before reaching the predetermined reference length Ld.

In step 360, in the case where there is a distance of the effective space width Le or greater between the end part of the parked vehicle Z1 related the completion flag and the end part of the parked vehicle Z2 whose position is estimated by the rotation correction processing part 13A and the parabola approximation part 13B, the parking space detecting part 12A estimates that there is the effective parking space S2 on the far side of the parked vehicle Z1 and sets a parking space available flag. Further, in the case where there is a distance of the effective space width Le or greater between the end part of the parked vehicle Z1 related to the completion flag and the end part of the parked vehicle Z2 whose position is estimated by the rotation correction processing part 13A and the oval approximation part 13C as described above, the parking space detecting part 12A may estimate that there is the available parking space S2 on the far side of the parked vehicle Z1 and set a parking space available flag, in order to increase the precision of estimating the position. With the parking space available flag set in step 360, the parking assistance part 12D outputs a ping sound via the speaker 24 (see FIG. 1), and at the same time executes a steering instruction for guiding the vehicle to the parking initial position in step 320 as described above. On the other hand, when there is a distance less than the effective space width Le between the parked vehicle Z1 and the parked vehicle Z2 in step 360, a parking space unavailable flag is set and the process proceeds to step 370.

In step 370, with the parking space unavailable flag set, the parking assistance part 12D outputs a ping sound via the speaker 24 (see FIG. 1) (the ping sound here is preferably different from that used when the parking space available flag is set, to let the driver recognize the difference aurally), and to notify the driver that there is no available parking space, instead of executing the steering instruction for guiding the vehicle to the parking initial position. Accordingly, the driver can aurally understand which is the side where no available parking space exists. Further, there may be, for example, a sound output or a steering instruction display meaning "Please run forward slowly by keeping the steering wheel straight until you hear a ding-dong sound" as the steering instruction. This steering instruction display is made on the display 22 with the ping sound when the parking space unavailable flag is set as described above. Accordingly, the driver can easily understand that there is no need to turn the steering wheel, and understand to run the vehicle forward slowly by keeping the steering wheel straight until the notification of a ding-dong sound, informing the driver that a new available parking space is detected, is outputted. It is preferable that the presence or absence of the notifying operation such as the ping sound output in the case where the parking space unavailable flag is set, can be selected by a user so as to reflect the user's intention.

When the current position of the vehicle corresponds to the parking initial position as a result of the process as shown in FIG. 9, the parking assistance part 12D outputs a ding-dong sound via the speaker 24 and at the same time outputs a message meaning "Assistance in backing up can be started by moving the shift lever into R" by display and/or voice, thereby the guidance to the parking initial position is finished.

The parking assistance part 12D starts parking assistance of the vehicle in backing up from the parking initial position into the parking space, according to the data of the start point and the end point of the obstacle obtained from the oval approximation part 13C. The parking assistance in backing up of the vehicle may be performed by a following procedure.

First, with the vehicle stopped at the parking initial position, the parking assistance part 12D displays, on the display 22 provided in the cabin of the vehicle, a picture (actual image) imaged by a back monitor camera 20 which images a scene in a predetermined angular area in the back of the vehicle. At this time, a target parking frame is displayed in an overlapping manner on the imaged picture of the display 22, as shown by dotted lines in FIG. 11 (a display for perpendicular parking). The target parking frame may have a shape imitating an actual parking frame or an outer shape of the vehicle. For example, the target parking frame has a form such that position and orientation can be visibly recognized by the user.

Figure 11:
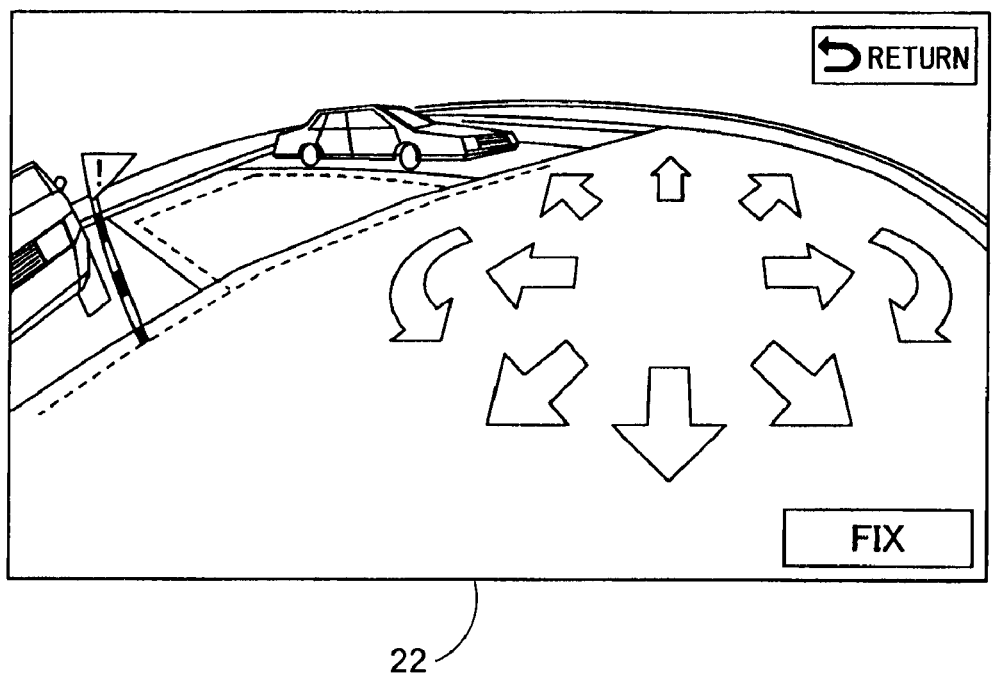
FIG. 11 is a diagram showing an example of a touch panel for setting a target parking position on a display 22.

Here, an initial display position of the target parking frame displayed on the display 22 is calculated according to the data of the start point and end point of the obstacles obtained from the oval approximation part 13C. The position of the target parking frame may be fixed by a final operation of a fix switch and the like by the user. Alternatively, before operating the fix switch, the position of the target parking frame and the like may be adjusted by a touch switch and the like for moving the target parking frame to be translated or rotated in up, down, left, and right directions, as shown in FIG. 11.

When the position of the target parking frame is fixed, the parking assistance part 12D determines a target parking position according to the position of the target parking frame, and calculates a target movement trajectory suitable for backing up the vehicle to the determined target parking position. At this time, the target movement trajectory is generated according to, for example, the data of the end points of the obstacle adjacent to the parking space, so that the vehicle does not interfere with the obstacle. In this case, the data of the end points of the obstacle may be the data of the end points of the obstacle obtained by the parabola approximation, or the data of the end points of the obstacle obtained by the oval approximation with a higher reliability.

When the vehicle starts backing up, the parking assistance part 12D in an automatic guiding control estimates the position of the vehicle by using a vehicle movement amount calculated by the output signals of the vehicle speed sensor 18 and the steering angle position obtained by the steering angle sensor 16, calculates a target steering angle responsive to a deviation of the estimated vehicle position from the target movement trajectory, and sends the target steering angle to a steering control ECU 30. The steering control ECU 30 controls the motor 32 to realize the target steering angle. Note that the motor 32 may be provided in a steering column or a steering gear box, and a steering shaft may be rotated by the angular rotation of the motor 32. The parking assistance part 12D requests the driver to stop the vehicle (or automatically stops the vehicle by an automatic control unit) when the vehicle is appropriately guided to the target final parking position in the parking space, to complete the parking assistance control.

In this manner, according to this embodiment, the steering instruction for driving to the parking initial position is executed in a stage where the sequence of points is not detected in the predetermined reference length Ld or greater after the sequence of points with the predetermined reference length Lb or greater is detected. Therefore, the time to start the parking assistance (guidance to the parking initial position) can be set earlier by comparing it to, for example, the configuration to execute the steering instruction for driving to the parking initial position in a stage where the sequence of points is not detected in the effective space width Le or greater after the sequence of points with the predetermined reference length Lb or greater is detected. Moreover, such a situation can be suppressed where the vehicle cannot be guided to the parking initial position from which the parking into the parking space can be appropriately assisted. Further, by changing the predetermined reference length Ld in response to the vehicle speed, the time to start the parking assistance (guidance to the parking initial position) can be adjusted. Therefore, such a situation can be suppressed where the vehicle cannot be guided to the parking initial position from which the parking into the parking space can be appropriately assisted. This is especially effective for the perpendicular parking, in which case it is difficult to bring the vehicle to the appropriate parking initial position unless the driver starts turning the steering wheel right after the vehicle passes by an object such as an obstacle.

Further, by setting an emission direction of the waves emitted from the ranging sensor 70 to be variable, an available parking space can be more appropriately detected.

Heretofore, the preferred embodiment of the present invention has been described in detail. However, the present invention is not limited to the above-described embodiment, and various modifications and alterations can be added to the embodiment without departing from the scope of the present invention.

For example, in the embodiment, various applications (for example, the process of the parking space detecting part 12A and the like) are started when the parking switch 52 is turned on; however, the present invention is not limited to this. For example, even when the parking switch 52 is not turned on, the applications may be started in the case where the vehicle speed is reduced to a predetermined value or less, the case where the vehicle position is determined to be within a parking lot according to map data of a navigation device, and the like. In this case, a configuration having no parking switch 52 can be considered as well.

Further, in the embodiment, the end points (start point and end point) of the obstacle are used to estimate the shapes of the obstacle, to be used as favorable parameters in determining the target parking position, the parking initial position, and the like. However, the present invention is not limited to this. As the shape of the obstacle, the orientation (orientation of a front surface of the obstacle) or contour shape of the obstacle may be estimated as well. Moreover, the start point and the end point along the running direction of the host vehicle are not necessarily employed as the start point and the end point of the obstacle. For example, in the case where the direction of a line (line on an entrance side) of the actual parking frame is detected by image recognition and the like, the start point and the end point of the obstacle along the line of the parking frame may be derived.

Further, in the embodiment, the obstacles are presumed to be four-wheel vehicles for the convenience of description; however, the obstacles can be presumed to be various objects such as bicycles, two-wheel vehicles, walls, and two or more pylons.

Further, in the above-described embodiment, the data related to the position of the vehicle and the like are acquired and derived by using the vehicle speed sensor 18 and the steering angle sensor 16. However, a yaw rate sensor, a gyro sensor, a goniometer, a GPS measurement result, and the like may be used instead of them.

Further, the notification assistance, the steering assistance, and the like for the vehicle to reach the appropriate parking initial position are included in the assistance operations performed by the guiding units such as a system required for the steering of the vehicle and the like, including the parking assistance part 12D, the display 22, the speaker 24, and the steering control ECU 30. The steering assistance may include the assistance by automatic running. Here, the automatic running is not necessarily limited to the case where all the driving operations are performed by automatic control, but includes the case of semiautomatic control, where only a part of the required driving operations is performed automatically. For example, there are semiautomatic control where speed is controlled by the driver and steering is controlled by automatic control, and semiautomatic control where the speed is controlled by automatic control and the steering is controlled by the driver.

Further, the notification assistance is not limited to be performed by sound or display. The notification assistance may be performed by forcibly adding a steering force to the steering wheel for a short time, or operating a vibration mechanism provided in the steering wheel or the driver's seat.

This patent application is based on Japanese Priority Patent Application No. 2007-047545 filed on Feb. 27, 2007, the entire contents of which are hereby incorporated herein by reference.

The invention claimed is:

1. A parking assistance device comprising:
a sensor that detects an object;
a guiding unit configured to guide a vehicle to a parking initial position from which the vehicle can be parked in a parking space, the parking space being located adjacent to and on a far side of the object located adjacent to the vehicle, the far side of the object being defined with respect to a running direction of the vehicle;
a timing setting unit configured to set a timing to start guiding the vehicle based on a speed of the vehicle; and
an obstacle detecting unit configured to detect an obstacle adjacent to the vehicle in response to a reflected wave of a wave emitted from the vehicle in a predetermined direction,
wherein, when an obstacle is not detected, in the running direction of the vehicle, in the parking space within a predetermined distance from the object, the guiding unit starts guiding the vehicle, the predetermined distance being a reference length extending from the far side of the object in the running direction of the vehicle, and
wherein the timing setting unit adjusts the predetermined distance based on the speed of the vehicle.

2. The parking assistance device as claimed in claim 1, wherein the parking space is a space sandwiched between the object and an obstacle located in the running direction.

3. The parking assistance device as claimed in claim 1, wherein the predetermined distance is less than an effective width required for the vehicle to be parked in the parking space.

4. The parking assistance device as claimed in claim 3, wherein when an obstacle in the parking space is detected within the predetermined distance by the obstacle detecting unit, the guiding unit guides the vehicle according to a clearance distance between the object and the obstacle, which is detected by the reflected wave, the clearance distance being calculated and obtained according to the reflected wave obtained after the obstacle is detected.

5. The parking assistance device as claimed in claim 4, wherein the guiding unit starts guiding the vehicle when the calculated and obtained clearance distance is the effective width or greater.

6. The parking assistance device as claimed in claim 4, wherein when the calculated and obtained clearance distance is less than the effective width, the guiding unit delays or cancels a start of guiding the vehicle.

7. The parking assistance device as claimed in claim 4, wherein when the calculated and obtained clearance distance is less than the effective width, the guiding unit makes a notification meaning that the parking space is narrower than the effective width.

8. A parking assistance device comprising:
a sensor that detects an object;
a guiding unit configured to guide a vehicle to a parking initial position from which the vehicle can be parked in a parking space, the parking space being located adjacent to and on a far side of an object located adjacent to the vehicle, the far side of the object being defined with respect to a running direction of the vehicle;
an obstacle detecting unit configured to detect an obstacle adjacent to the vehicle in response to a reflected wave of a wave emitted from the vehicle in a predetermined direction; and
a timing setting unit configured to set a timing to start guiding the vehicle based on a detection result of the obstacle detecting unit, the detection result indicating whether an obstacle was detected, in the running direction of the vehicle, in the parking space within a predetermined distance from the object, the predetermined distance being a reference length extending from the far side of the object in the running direction of the vehicle,
wherein the predetermined distance is adjusted based on a speed of the vehicle.

9. The parking assistance device as claimed in claim 8, wherein the guiding unit starts guiding the vehicle when the obstacle is not detected, by the obstacle detecting unit, in the parking space within the predetermined distance.

10. The parking assistance device as claimed in claim 8, wherein the parking space is a space sandwiched between the object and an obstacle located in the running direction.

11. The parking assistance device as claimed in claim 8, wherein the predetermined distance is less than an effective width required for the vehicle to be parked in the parking space.

12. The parking assistance device as claimed in claim 11, wherein when an obstacle in the parking space is detected within the predetermined distance by the obstacle detecting unit, the guiding unit guides the vehicle according to a clearance distance between the object and the obstacle, which is detected by the reflected wave, the clearance distance being calculated and obtained according to the reflected wave obtained after the obstacle is detected.

13. The parking assistance device as claimed in claim 12, wherein the guiding unit starts guiding the vehicle when the calculated and obtained clearance distance is the effective width or greater.

14. The parking assistance device as claimed in claim 12, wherein when the calculated and obtained clearance distance is less than the effective width, the guiding unit delays or cancels a start of guiding the vehicle.

15. The parking assistance device as claimed in claim 12, wherein when the calculated and obtained clearance distance is less than the effective width, the guiding unit makes a notification meaning that the parking space is narrower than the effective width.

16. The parking assistance device as claimed in claim 1, wherein the obstacle detecting unit estimates whether a parking space is available based on whether the obstacle is detected within the predetermined distance.

* * * * *